(12) United States Patent
Furuta

(10) Patent No.: US 11,904,634 B2
(45) Date of Patent: Feb. 20, 2024

(54) BRAKE DEVICE FOR CASTER

(71) Applicant: GENESIS CO., LTD., Hamamatsu (JP)

(72) Inventor: Yoshihisa Furuta, Hamamatsu (JP)

(73) Assignee: GENESIS CO., LTD., Hamamatsu (JP)

( * ) Notice: Subject to any disclaimer, the term of this patent is extended or adjusted under 35 U.S.C. 154(b) by 358 days.

(21) Appl. No.: 17/055,693

(22) PCT Filed: May 25, 2020

(86) PCT No.: PCT/JP2020/020551
§ 371 (c)(1),
(2) Date: Nov. 16, 2020

(87) PCT Pub. No.: WO2021/075079
PCT Pub. Date: Apr. 22, 2021

(65) Prior Publication Data
US 2021/0362545 A1 Nov. 25, 2021

(30) Foreign Application Priority Data
Oct. 16, 2019 (JP) ................. 2019-189454

(51) Int. Cl.
*B60B 33/00* (2006.01)
*B62B 5/04* (2006.01)

(52) U.S. Cl.
CPC ...... *B60B 33/0086* (2013.01); *B60B 33/0092* (2013.01); *B60B 2200/43* (2013.01); *B60B 2900/3312* (2013.01); *B62B 5/0438* (2013.01); *B62B 5/0461* (2013.01); *B62B 2301/044* (2013.01)

(58) Field of Classification Search
CPC ........... B60B 33/0086; B60B 33/0092; B60B 2200/43; B60B 2900/3312; B60B 33/00; B62B 5/0438; B62B 5/0461; B62B 2301/044; F16D 63/006
See application file for complete search history.

(56) References Cited

U.S. PATENT DOCUMENTS 4,248,445 A * 2/1981 Vassar ................. B60B 33/021
16/35 R
9,908,367 B2 * 3/2018 Yamamoto .......... B60B 33/0078
(Continued)

FOREIGN PATENT DOCUMENTS

DE 102016113069 A1 * 1/2018 ......... B30B 15/0094
JP H11-240305 A 9/1999
(Continued)

*Primary Examiner* — Thomas W Irvin
(74) *Attorney, Agent, or Firm* — POSZ LAW GROUP, PLC

(57) ABSTRACT

An object to provide a brake device for a caster that has a simple structure, provides reliable braking, has no risk of damaging the circumferential surface of a roller, and has high durability. The brake device for a caster includes: a plurality of projecting parts formed concentrically at regular intervals on opposite side-surfaces of a roller in a direction in parallel with the axis, and levers set across the roller at both side-panels of a fork so as to be opposed to the projecting parts, and a claw formed at a tip of each of the levers so as to be opposed to the projecting parts, wherein the levers are operated so that the claw is engaged with a concave part formed between the projecting parts, thereby locking rotation of the roller.

4 Claims, 9 Drawing Sheets

(56) References Cited

U.S. PATENT DOCUMENTS

| | | | |
|---|---|---|---|
| 10,106,186 B2* | 10/2018 | Choi | C08K 5/00 |
| 11,065,913 B2* | 7/2021 | Molozis | B60B 33/0086 |
| 11,247,509 B2* | 2/2022 | Hartkopf | B60B 33/0086 |
| 2011/0119864 A1* | 5/2011 | Minowa | B60B 33/0092 |
| | | | 16/45 |
| 2017/0173998 A1* | 6/2017 | Yamamoto | B60B 33/0039 |
| 2021/0001666 A1* | 1/2021 | Furuta | B62B 5/0438 |
| 2021/0039703 A1* | 2/2021 | Kato | B62B 5/0066 |
| 2021/0276366 A1* | 9/2021 | Hartkopf | B60B 33/025 |
| 2022/0153251 A1* | 5/2022 | Yokoyama | F16D 55/226 |

FOREIGN PATENT DOCUMENTS

| | | |
|---|---|---|
| JP | 2008-302903 A | 12/2008 |
| JP | 2017-039405 A | 2/2017 |

\* cited by examiner

Fig.7
(a)
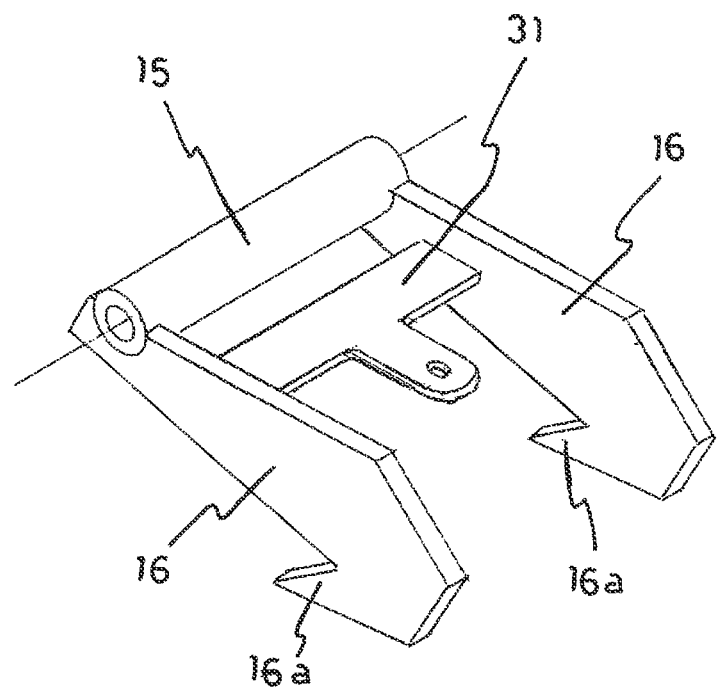
(b)
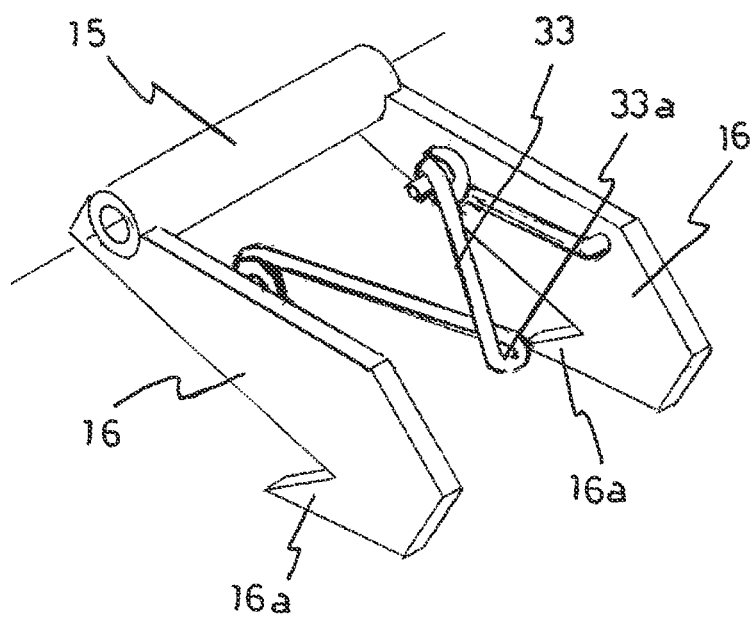

BRAKE DEVICE FOR CASTER

CROSS REFERENCE TO RELATED APPLICATIONS

This application is a U.S. national stage of International Patent Application No. PCT/JP2020/020551 filed on May 25, 2020 and is based on Japanese Patent Application No. 2019-189454 filed on Oct. 16, 2019 the disclosures of which are incorporated herein by reference.

TECHNICAL FIELD

The present invention relates to a brake device for a caster.

BACKGROUND ART

As disclosed in PTL 1, a brake device for a caster is available, in which a brake shoe is disposed at a frame (fork), and an operation body is inserted and fitted in a hole drilled in the top panel of a frame, and the operation body is operated synchronously via a transfer means constituted of a cam, a link rod, and the like connected to a brake operation lever.

CITATION LIST

Patent Literature

[PTL 1] Japanese Patent Application Publication No. 2008-302903

SUMMARY OF INVENTION

Technical Problem

Incidentally, in the brake device disclosed in PTL 1, the brake shoe is brought into contact with the circumferential surface of a roller so that the roller is braked by frictional resistance caused by the contact. For this reason, the braking effect may be reduced, and the circumferential surface of the roller may be damaged.

The present invention was completed in view of the problem in the background art. It is an object of the present invention to provide a break device for a caster, which has a simple structure, provides reliable braking, has no risk of damaging the circumferential surface of a roller, and has high durability.

Solution to Problem

In order to attain the foregoing object, the present invention provides a brake device for a caster according to [1] to [5] below.

[1] A brake device for a caster including: a plurality of projecting parts formed concentrically on opposite side-surfaces of a roller, and levers set across the roller at opposite side-panels of a fork so as to be opposed to each of the projecting parts, and a claw formed at a tip of each of the levers so as to be opposed to the projecting parts, wherein the levers are operated, so that the claw is engaged with a concave part formed between the projecting parts, thereby locking rotation of the roller.

[2] The brake device for a caster according to the [1], wherein an inclined surface inclined at an acute angle with respect to a line connecting an outer circumferential end of the projecting part and a center of the roller is formed at an end face of the projecting part that comes in contact with the claw of the lever.

[3] The brake device for a caster according to the [1] or [2], wherein the lever is operated by a cable coupled to an operation lever, and the cable is rotatably coupled to the lever.

[4] The brake device for a caster according to the [3], wherein a spring is interposed at an intermediate point of the cable and/or between the cable and the lever.

[5] The break device for a caster according to the [3] or [4], wherein a cable coupling unit having a slide body is set at an intermediate point of the cable, and the cable on the operation lever side and a cable on the lever side are coupled via the slide body.

Advantageous Effects of Invention

With the break device for a caster in accordance with the present invention according to the [1], the claw of the lever is engaged with the projecting part formed at the side-surface of the roller, thereby applying brake to the roller. Accordingly, a reliable braking effect can be obtained, and the circumferential surface of the roller will not be damaged. For this reason, the durability is also high, and further the structure is simple.

With the break device for a caster in accordance with the present invention according to the [2], in addition to the effect, the claw of the lever is engaged with the inclined surface of the projecting part, and hence the engagement becomes firm, resulting in further enhancement of the braking effect.

With the break device for a caster in accordance with the present invention according to the [3], in addition to the effect, even when the roller rotates, the cable will not be twisted.

With the break device for a caster in accordance with the present invention according to the [4], in addition to the effect, when release cannot be performed with ease due to biting of the claw of the lever into the concave part between the projecting parts, or the like, the interposed spring is stretched, which can reduce the burden on the cable. In addition, also subsequently, the spring is urged on the lever in the direction of release, which performs the action of releasing the brake.

With the break device for a caster in accordance with the present invention according to the [5], in addition to the effect, a plurality of the cables of the operation levers are coupled with the slide body, and a plurality of cables to the levers of the casters are coupled with the slide body. As a result, it is possible to transfer the power of the selected operation lever to each caster.

BRIEF DESCRIPTION OF DRAWINGS

FIG. 7 is a conceptual perspective view showing a modified example of a lever of the break device for a caster in accordance with the present invention.

DESCRIPTION OF EMBODIMENTS

Below, a break device for a caster in accordance with the present invention will be described in details by way of embodiments shown in the accompanying drawings.

Figure 1:
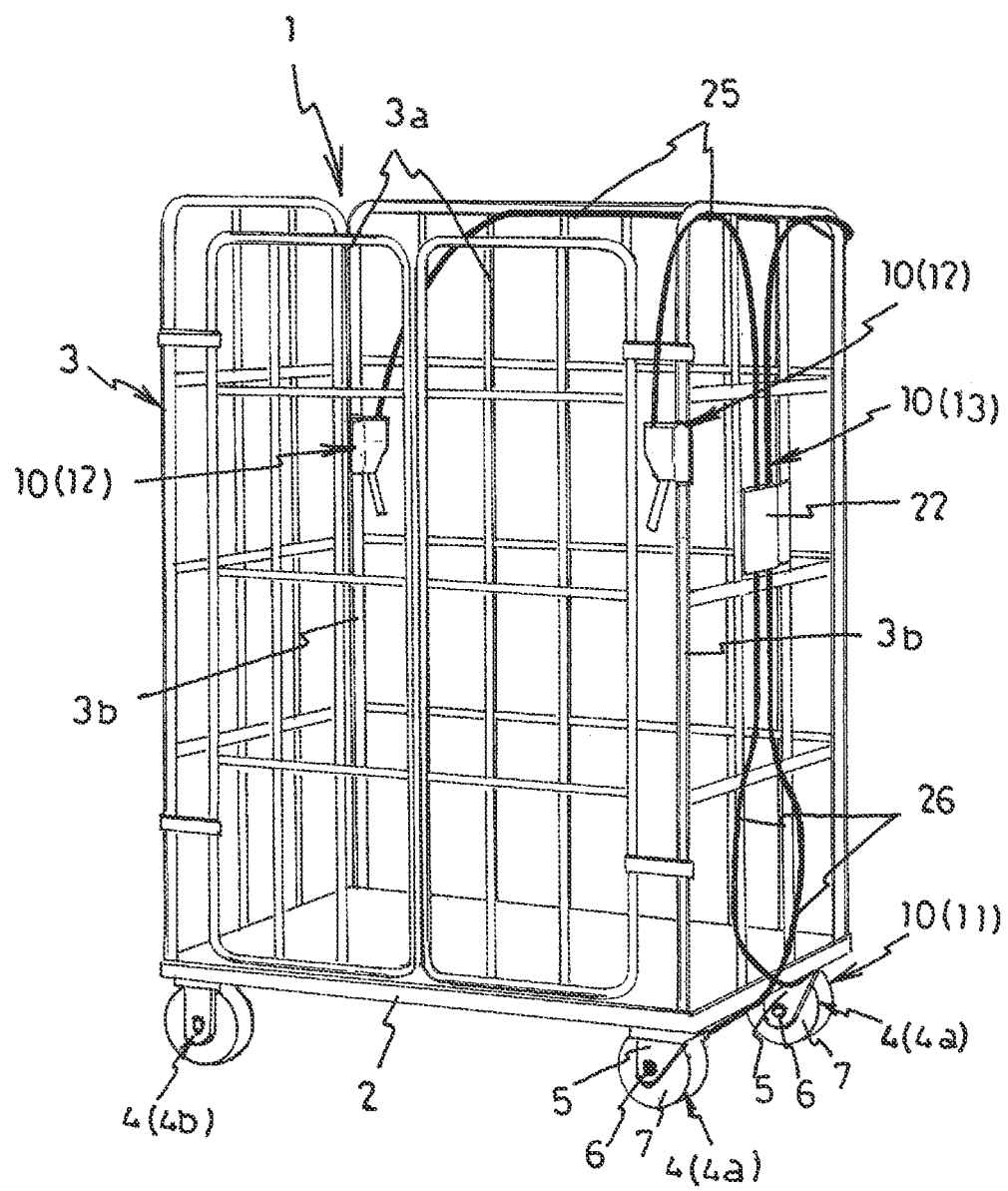
FIG. 1 is a perspective view showing one embodiment of a trolley mounting a break device for a caster in accordance with the present invention thereon.

FIG. 1 shows a basket trolley 1. The basket trolley 1 has a rectangular bottom panel 2. Then, a fence 3 is vertically arranged in the periphery of the bottom panel 2. One side of the fence 3 includes double doors 3a.

Figure 2:
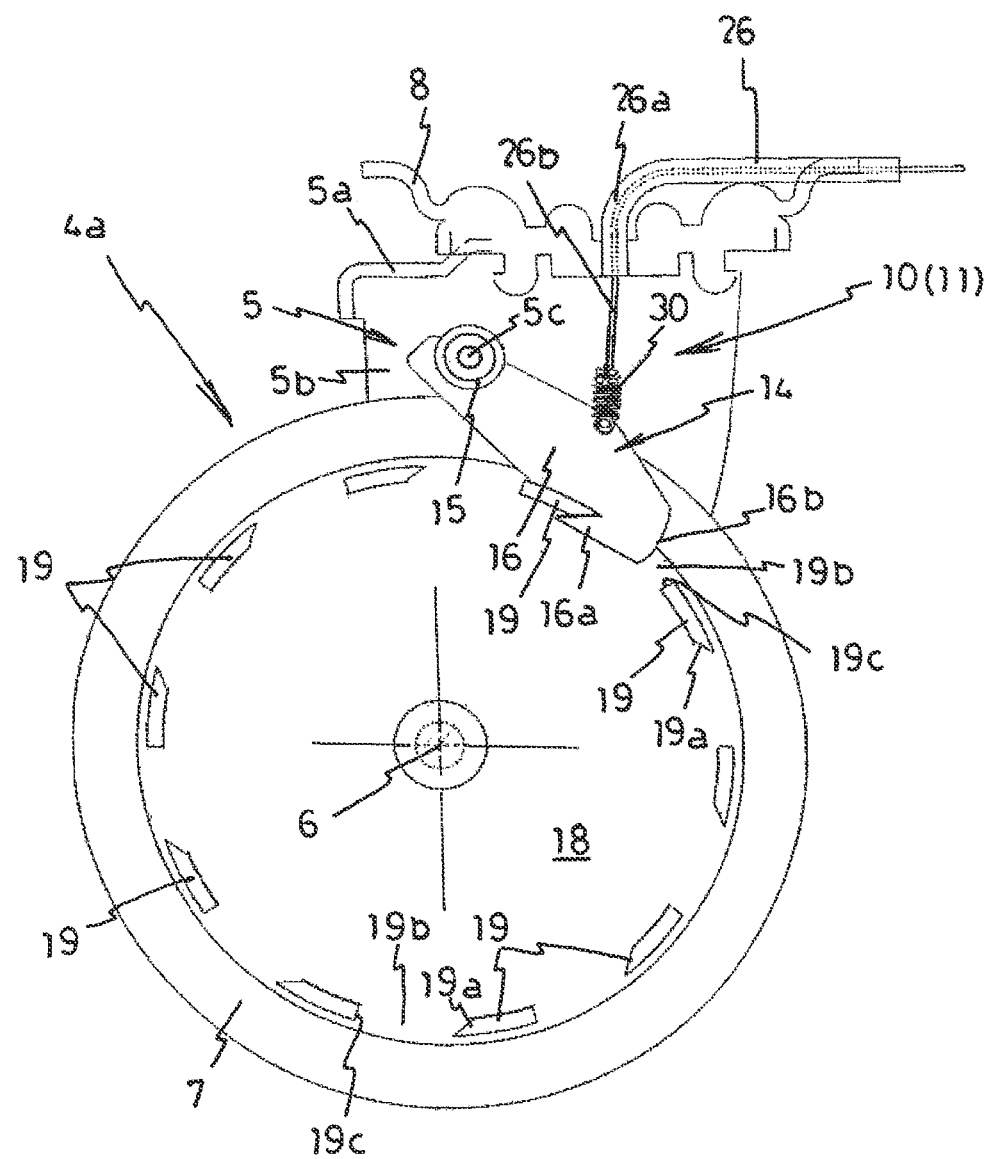
FIG. 2 is a conceptual longitudinal cross sectional view of a caster showing the essential part of the break device for a caster in accordance with the present invention, and shows a brake operating state.

Casters 4 are set at the four corners of the bottom panel 2. Out of these, two casters are rotatable casters 4a, and the residual two casters are fixed casters 4b. As shown in FIG. 2, each rotatable caster 4a includes a fork 5 in a generally U shape including a top panel 5a and side-panels 5b bent in a direction at right angles from the opposite ends thereof. A shaft 6 is laid across both the side-panels 5b, 5b of the fork 5 in an inserted manner, and a roller 7 is rotatably held by the shaft 6. At the lower surface of the bottom panel 2 of the basket trolley 1, a mount stand 8 is fixedly set as shown in FIG. 2. The top panel 5a of the fork 5 is rotatably set at the mount stand 8 via a bearing not shown.

The basket trolley 1 includes a brake device 10 of the rotatable caster 4a set therein. As shown in FIG. 1, the brake device 10 includes a brake part 11 set at the rotatable caster 4a, an operation part 12 set at a column 3b situated diagonally with respect to the fence 3 in the embodiment shown, and a power transfer means 13 for coupling the brake part 11 and the operation part 12.

Figure 3:
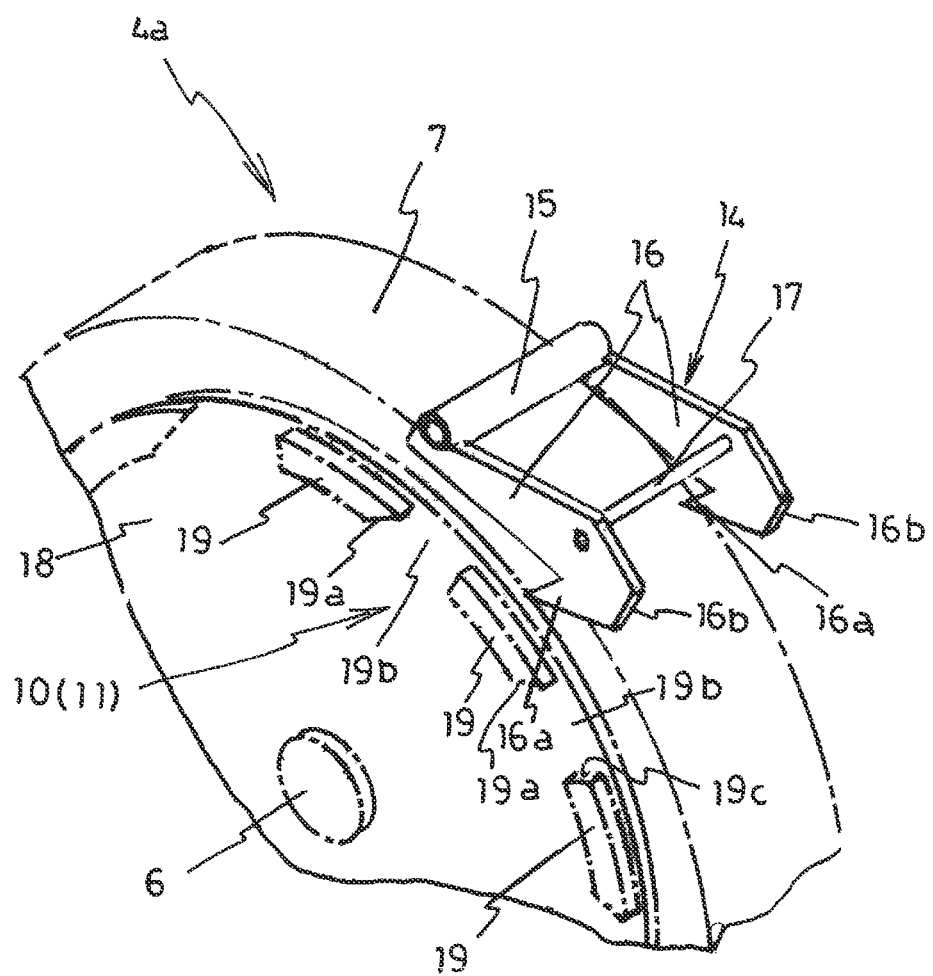
FIG. 3 is a conceptual partial perspective view of a caster showing the essential part of the break device for a caster in accordance with the present invention, and shows a brake release state.

The brake part 11 includes a frame 14. The frame 14 includes a tubular coupling tube 15, and levers 16 projecting in a direction at right angles from the opposite ends thereof in the embodiment illustrated in FIG. 3. Each lever 16 includes a claw 16a at the tip thereof. Then, the frame 14 is rotatably held by fitting the tubular coupling tube 15 to a shaft 5c set across the side-panels 5b, 5b of the fork 5. Then, the frame 14 is arranged so that the levers 16 sandwich the roller 7 as shown in FIG. 3. Further, a rod 17 for hanging a spring (or a direct cable) described later thereon is set across both the levers 16.

Whereas, at the brake part 11, a plurality of projecting parts 19 are formed at disks (the opposite side-panels of the wheel) 18 on the opposite side-surfaces of the roller 7. The projecting parts 19 are arranged at regular intervals in the circumferential direction concentrically with the disk 18. Then, an inclined surface 19a making an acute angle with the outer circumferential surface is formed at the end of each projecting part 19.

Figure 4:
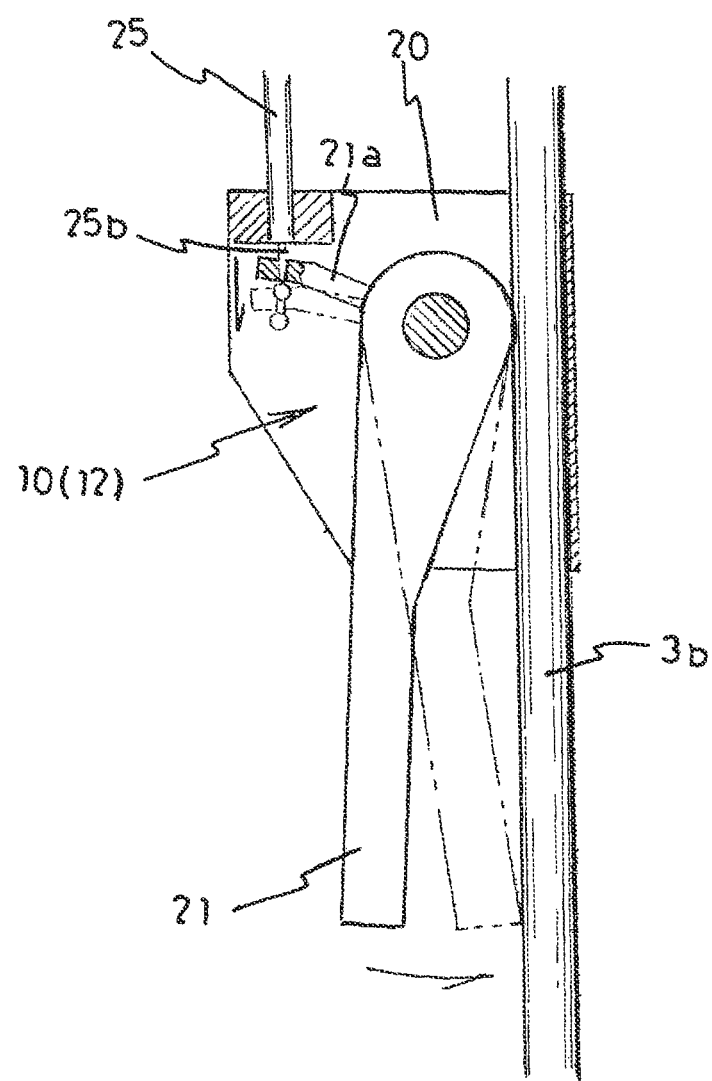
FIG. 4 is a conceptual cross sectional view showing an operation part of the break device for a caster in accordance with the present invention.

At the operation part 12, a bracket 20 is set at the column 3b of the fence 3 as shown in FIG. 4. An operation lever 21 is rotatably set at the bracket 20. A tongue piece 21a for holding a cable described later is protrusively provided at the base of the operation lever 21.

The power transfer means 13 includes a cable coupling unit 22 set at the side surface of the fence 3. The cable coupling unit 22 includes a slide body 24 in a case 23 in the embodiment shown in FIG. 5. The slide body 24 is for coupling an operation part side cable 25 and a brake part side cable 26. With the cable coupling unit 22, an outer tube 25a of the cable 25 is engaged with one end of the case 23, and an outer tube 26a of the cable 26 is engaged with the other end of the case 23. Then, an inner cable 25b of the cable 25 is engaged with one end of the slide body 24 by a screw 27, and an inner cable 26b of the cable 26 is engaged with the other end of the slide body 24 via a spring 28.

Further, with the cable coupling unit 22, the slide body 24 is urged to the brake part side (downward of FIG. 5) by a spring 29 fitted loosely to the inner cable 25b of the cable 25. Incidentally, as shown in FIG. 1, the cable 25 is guided upward from the operation part 12 along the column 3b, and crawls on the upper end and the side surface of the fence 3 to be guided to the cable coupling unit 22. Whereas, the cable 26 crawls on the side surface of the fence 3 to be guided to the caster 4a, and is guided to the fork 5 through the rotation axis of the mount stand 8 as shown in FIG. 2. The outer tube 26a of the cable 26 is engaged with the top panel 5a, and the inner cable 26b is rotatably coupled to the end of a spring 30 using a swivel mechanism. Then, the other end of the spring 30 is engaged with the rod 17 of the lever 16.

Incidentally, when the spring 28 is provided at the cable coupling unit 22, the spring 30 provided at the brake part 11 is not necessarily required. It may be configured such that the inner cable 26b of the cable 26 is directly coupled to the rod 17 of the lever 16. Conversely, when the spring 30 is provided at the brake part 11, for the cable coupling unit 22, it may be configured such that the inner cable 26b of the cable 26 is directly engaged with the other end of the slide body 24 without the spring 28 interposed therebetween.

The opposite side end of the cable 25 is engaged with the tongue piece 21a of the operation lever 21 at the operation part 12 as shown in FIG. 4.

With the brake device 10 of the rotatable caster 4a of the embodiment, in the normal state, namely, at the position at which the operation lever 21 is not operated as indicated with a solid line, the slide body 24 of the cable coupling unit 22 is moved toward the brake part (downward of FIG. 5) by the urging force of the spring 29. As a result, the inner cable 26b of the cable 26 is relaxed as shown in FIG. 2, so that the lever 16 moves downward by its own weight, and further, the spring 28 or 30 presses thereagainst (in this case, the spring 28 or 30 performs an action of a press spring). Accordingly, the lever 16 is held downward, so that the claw 16a of the lever 16 is fitted into the concave part 19b between the projecting parts 19. In this state, the roller 7 is locked against the rotation in the forward direction (also in the backward direction) of the trolley 1. On the other hand, for the rotation in the counterclockwise direction of the roller 7, the tip wall 16b of the lever 16 comes in touch with the end face 19c of the adjacent projecting part 19, thereby hindering the rotation.

When the operation lever 21 is operated in the direction of the column 3b (the direction indicated with a two-dot chain line of FIG. 4), the inner cable 25b of the cable 25 is lowered. As a result, the slide body 24 of the cable coupling unit 22 is pulled in the direction of the operation part (upward of FIG. 5) against the urging force of the spring 29. Then, the lever 16 is rotated upward in FIG. 2 via the inner cable 26b of the cable 26 connected to the slide body 24. Accordingly, the claw 16a is separated from the projecting part 19 provided in addition on the roller 7. Therefore, the rotation of the roller 7 becomes free, and the trolley 1 can be run in the desirable direction.

At this step, namely, in order to separate the claw 16a of the lever 16 from the projecting part 19, it is necessary to rotate the roller 7 slightly anti-rotationally (in the counter-clockwise direction in FIG. 2). Meanwhile, the lifting force of the cable 26 acts on the lever 16. The spring 28 interposed at an intermediate point of the cable, or the spring 30 interposed between the cable and the lever is stretched. As a result, the burden on the cable or the damage of the lever can be prevented. In addition, the stretched spring 28 or 30 also subsequently urges the lever 16 in the release direction (in this case, the spring 28 or 30 performs the action of a stretching spring), and performs the action of releasing the brake.

Incidentally, with the break device for the embodiment, the inclined surface 19a is formed at the projecting part 19, and the claw 16a of the lever 16 is caused to bite into the inclined surface 19a. Accordingly, the claw 16a is engaged with the projecting part 19 with reliability. When the angle of the inclined surface 19a, namely, the angle made between the line connecting the outer circumferential end of the projecting part 19 and the center of the roller 7 and the inclined surface is large, the engagement between the claw 16a of the lever 16 and the projecting part 19 becomes more firm. However, when the locking of the roller 7 is released, it becomes difficult to separate the claw 16a from the projecting part 19. Therefore, in view of these, the angle is preferably about 30 to 50 degrees.

Further, in the embodiment, as shown in FIG. 2, the end of the inner cable 26b and the lever 16 are coupled via the stretching spring 30. However, the following is also acceptable. As shown in FIG. 7(a), a T-shaped flat spring 31 is disposed by being laid across the levers 16. A hole 32 is formed at the tip 31a, and one end of the inner cable 26b is rotatably coupled to the hole using a swivel mechanism or the like. The following is also acceptable. As shown in FIG. 7(b), a torsion coil spring 33 is disposed by being laid across the levers 16, and a hole 33a is formed at the center of the torsion coil spring 33. One end of the inner cable 26b is rotatably coupled with the hole 33a using a swivel mechanism, or the like.

Figure 8:
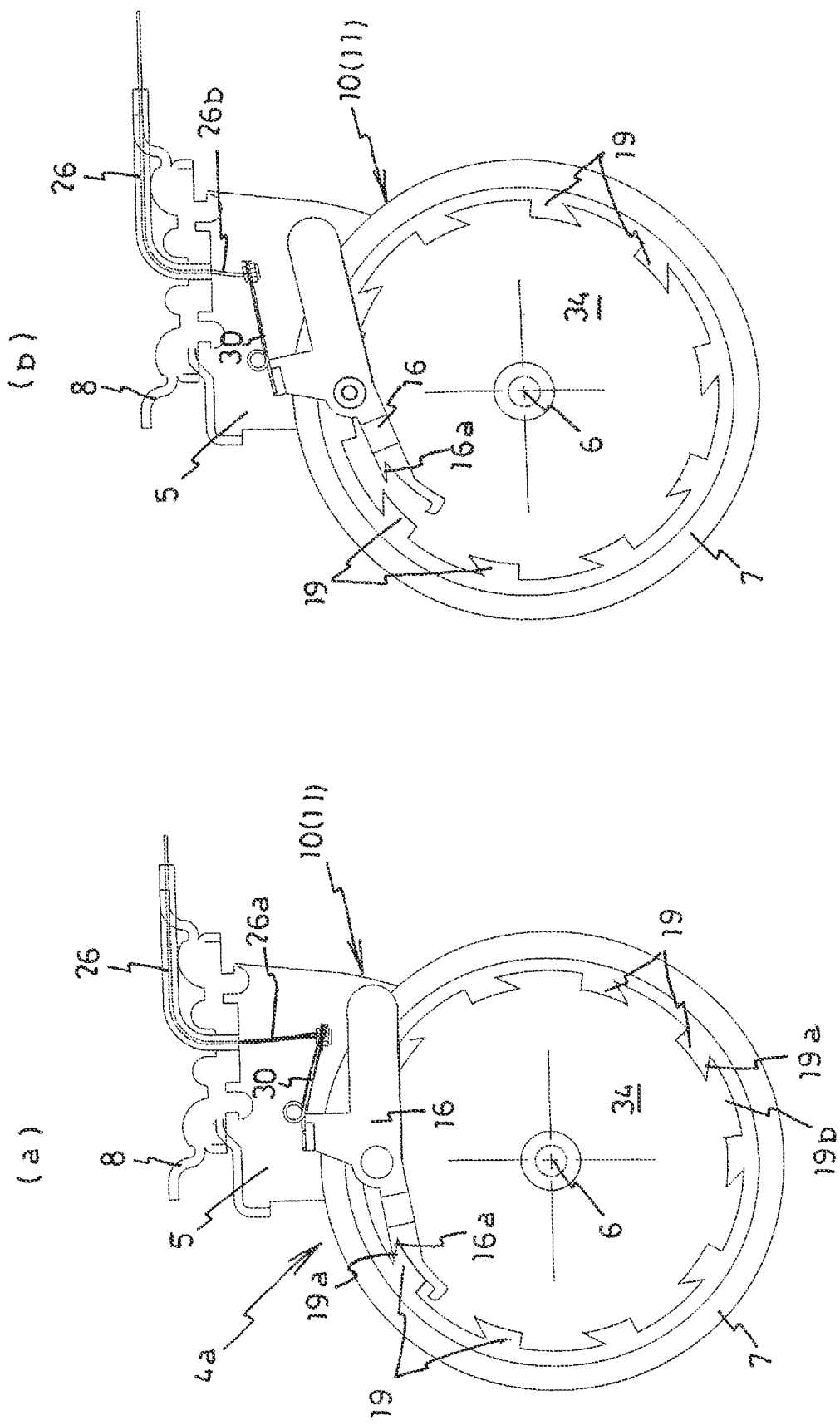
FIG. 8 is a conceptual longitudinal cross sectional view of a caster showing a modified example of the essential part of the break device for a caster in accordance with the present invention, and (a) is a view showing a brake operation state, and (b) is a view showing a break release state.

Further, in the embodiment, it is configured such that the lever 16 is engaged with the projecting part 19 projecting toward the side of the roller 7 from above as shown in FIG. 3. However, the following configuration is also acceptable. As shown in FIG. 8, the projecting part 19 is formed at the inner circumferential surface of the wheel 34 of the roller 7 in such a manner as to project in the direction of the shaft 6, so that the lever 16 is engaged with the projecting part 19 from below. Incidentally, the members and the parts performing the same actions as those in the embodiment are given the same reference numerals and signs in FIG. 8, and the description thereon is omitted.

Figure 5:
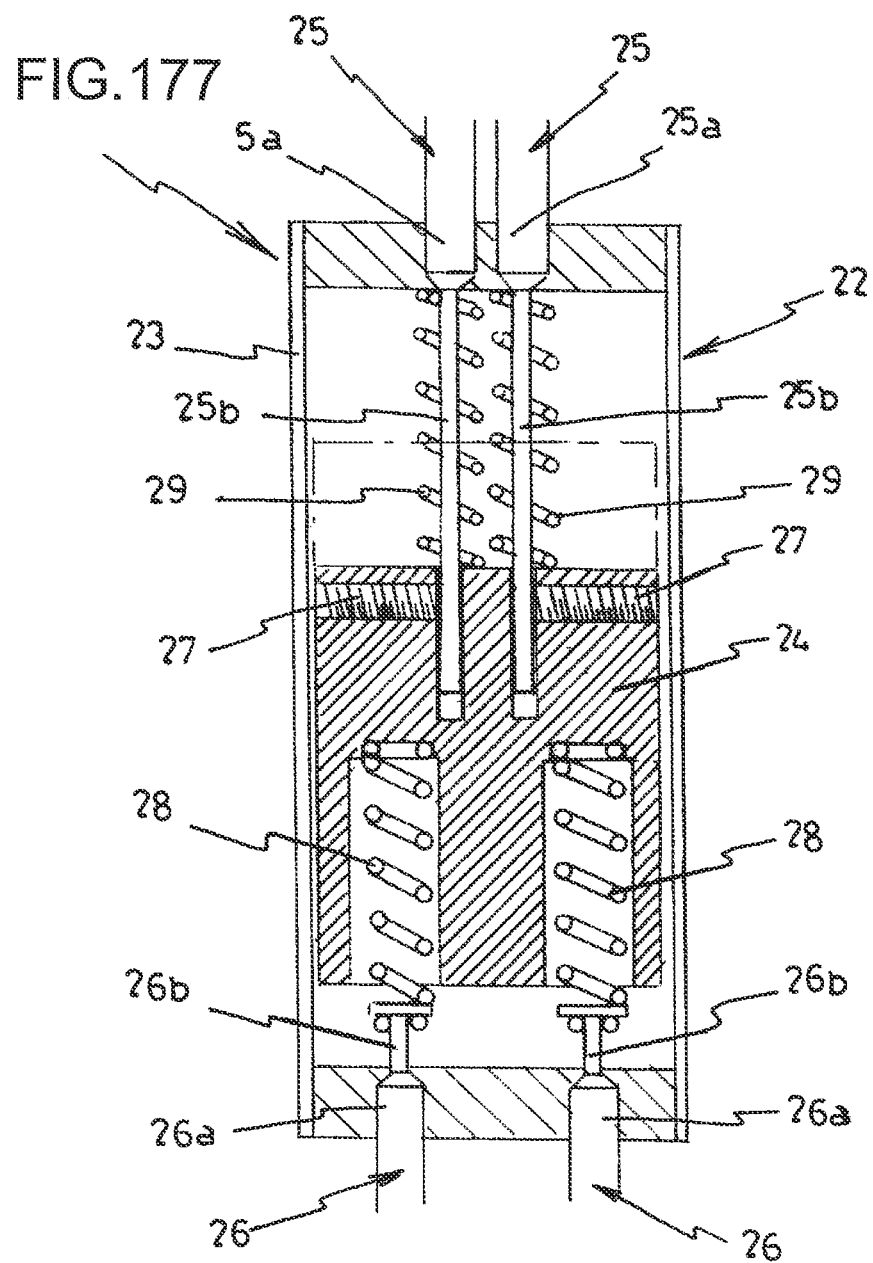
FIG. 5 is a conceptual cross sectional view showing a cable coupling unit of the break device for a caster in accordance with the present invention.
Figure 6:
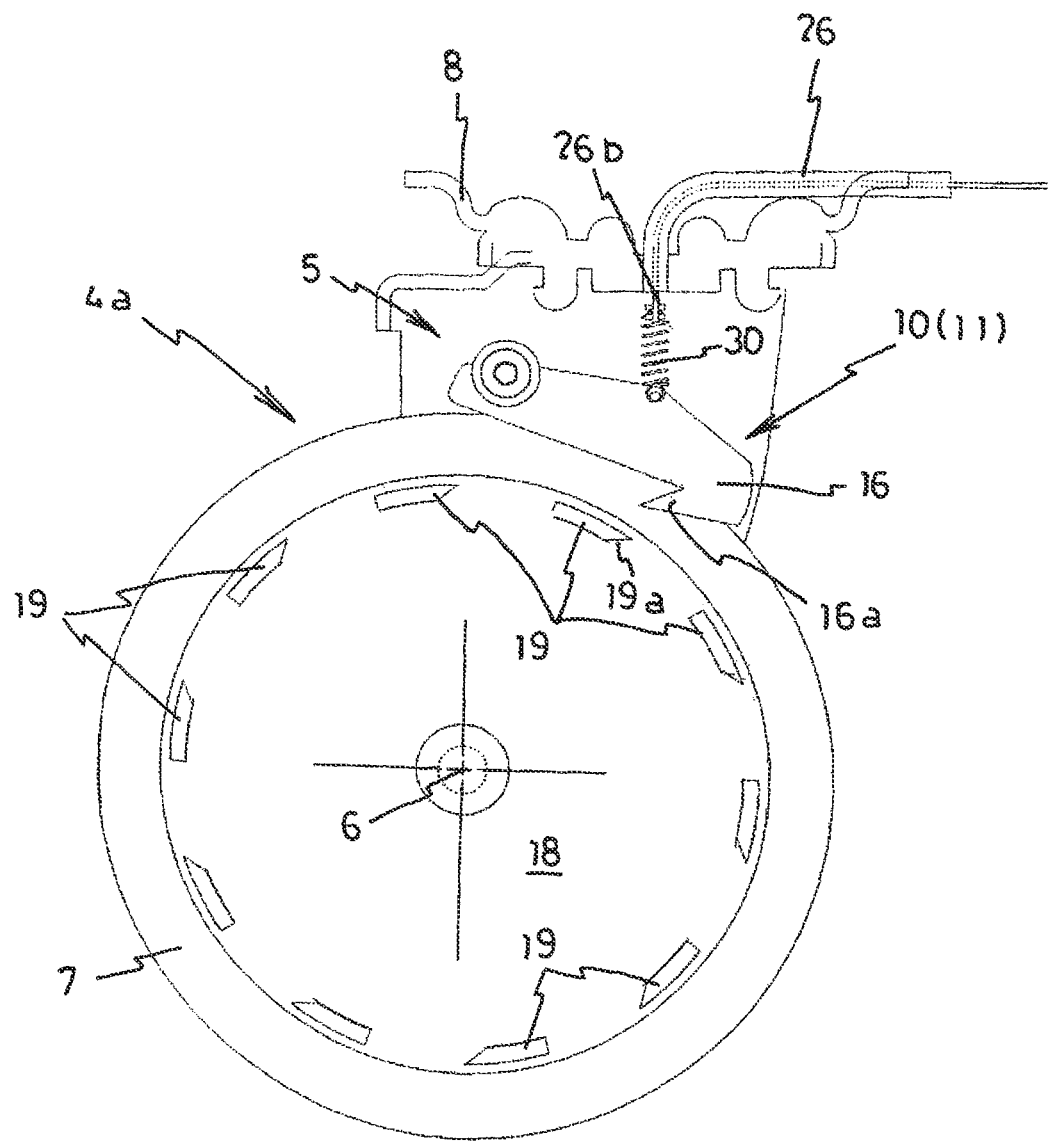
FIG. 6 is a conceptual longitudinal cross sectional view of a caster showing the essential part of the break device for a caster in accordance with the present invention, and shows a brake release state.
Figure 9:
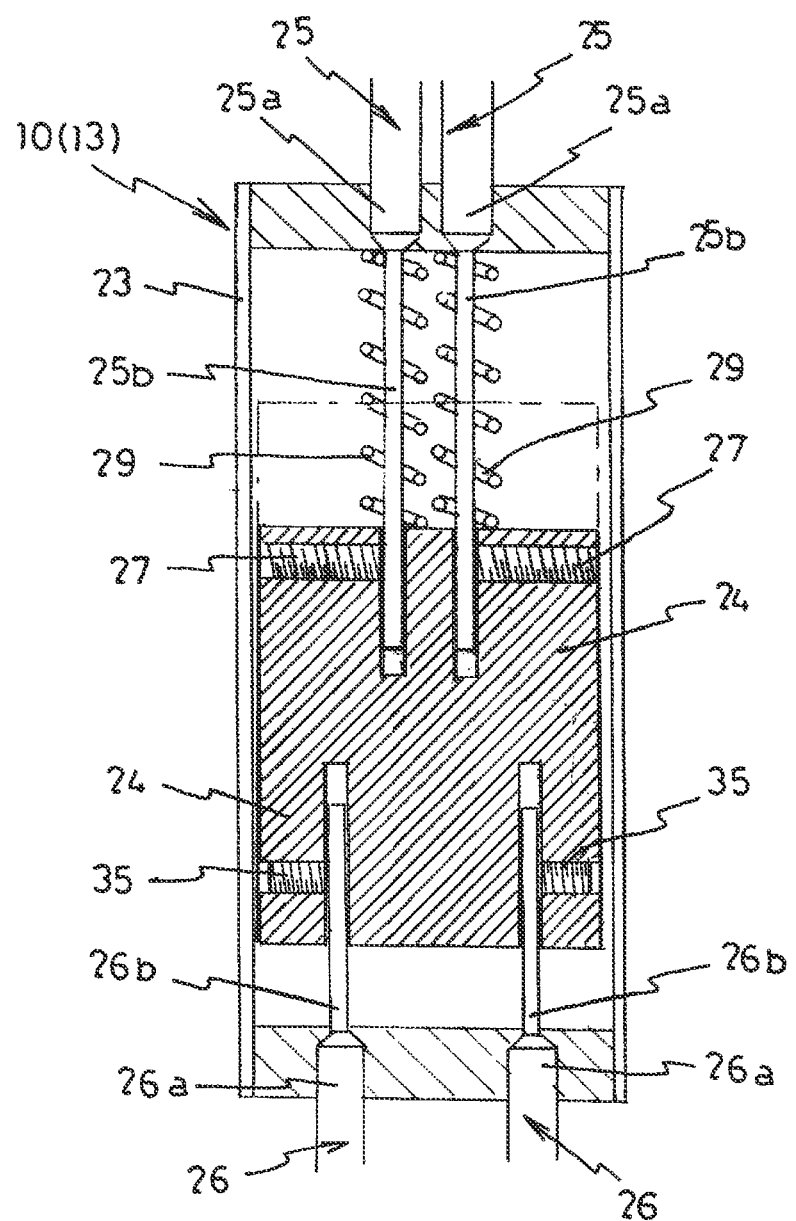
FIG. 9 is a conceptual cross sectional view showing a modified example of a cable coupling unit of the break device for a caster in accordance with the present invention.

Further, in the embodiment, as shown in FIG. 5, the configuration of the cable coupling unit 22 is configured such that the inner cable 26b of the brake part side cable 26 is engaged with the other end of the slide body 24 via the spring 28. However, when the spring 30 is provided at the brake part 11, as shown in FIG. 9, for the cable coupling unit 22, it may be configured such that the inner cable 26b of the cable 26 is directly engaged, by a screw 35, with the other end of the slide body 24 without the spring 28 interposed therebetween.

Up to this point, a description has been given to the embodiments of the break device for the rotatable caster in accordance with the present invention. However, it is naturally understood that the present invention is not limited to the embodiments at all, and may be variously modified or changed within the scope of the technical idea of the present invention described in the appended claims.

For example, in the embodiment, a description has been given by taking the basket trolley 1 as an example. However, the break device for a caster in accordance with the present invention is widely applicable as a break device for a caster for use in, for example, in addition to a flat trolley except for a basket trolley, and a folding trolley, a wheelchair, a stretcher, a baby buggy, a wagon, a bed, a copying machine, an IV stand, a compressor, a spot cooler, a power generator, or a welding machine.

REFERENCE SIGNS LIST

1 Trolley
2 Bottom panel
3 Fence
3a Door
3b Column
4 Caster
4a Rotatable caster
4b Fixed caster
5 Fork
5a Top panel
5b Side-panel
5c Shaft
6 Shaft
7 Roller
8 Mount stand
10 Brake device
11 Brake part
12 Operation part
13 Power transfer means
14 Frame
15 Coupling tube
16 Lever
16a Claw
16b Tip wall
17 Rod
18 Disk (side-panel of wheel)
19 Projecting part
19a Inclined surface
19b Concave part
19c End face
20 Bracket
21 Operation lever
21a Tongue piece
22 Cable coupling unit
23 Case
24 Slide body
25 Operation part side cable
25a Outer tube
25b Inner cable
26 Brake part side cable
26a Outer tube 26b Inner cable
27 Screw
28 Spring
29 Spring
30 Spring
31 Flat spring
31a Tip
32 Hole
33 Torsion coil spring
33a Hole
34 Wheel
35 Screw

The invention claimed is:

1. A brake device for a caster comprising:
a plurality of projecting parts formed on a roller,
a lever positioned to oppose a proximate one of the projecting parts, and
a claw formed at a tip of the lever, wherein the claw is configured to oppose the proximate one projecting part, wherein the lever is operable so that the claw enters a space formed between the proximate one projecting part and an adjacent projecting part to engage the proximate one projecting part to lock rotation of the roller, and wherein the lever releases the locking when the lever is pulled by a cable that is connected with an operation lever,
a cable coupling unit, which has a slide body, is located at an intermediate point of the cable, and an operation-part-side section of the cable is coupled to a brake-part-side section of the cable by the slide body,
the cable coupling unit includes a compression spring that applies a force to press the slide body towards the lever, and
at least one spring is operatively located between the cable and the slide body or between the cable and the lever.

2. The brake device for a caster according to claim 1, wherein an inclined surface inclined at an acute angle of 30 to 50 degrees with respect to a line connecting an outer circumferential end of each projecting part and a center of the roller is formed at an end face of each projecting part.

3. The brake device for a caster according to claim 1, wherein the lever is operated by a cable coupled to an operation lever, and the cable is rotatably coupled to the lever.

4. The brake device for a caster according to claim 1 wherein
the plurality of projecting parts includes a first set of projecting parts formed on a first side of the roller and a second set of projecting parts formed on a second side of the roller, and the first side of the roller is opposite to the second side of the roller,
the lever is one of a pair of first and second levers, and the first lever is located to correspond to the first side of the roller and the first set of projecting parts, and the proximate one of the projecting parts is a first proximate one of the first set of projecting parts,
the second lever is located to correspond to the second side of the roller and the second set of projecting parts, and the second lever is positioned to oppose a second proximate one of the second set of projecting parts,
the claw is a first claw formed at a tip of the first lever, and a second claw is formed at the tip of the second levers, and the pair of levers is operable so that the first claw engages the first proximate one of the projecting parts, and the second claw engages the second proximate one of the projecting parts to lock rotation of the roller, and
the pair of levers for locking the rotation of the roller releases the locking when the lever is pulled by the cable.

* * * * *